United States Patent [19]
Gillbanks et al.

[11] Patent Number: 5,366,344
[45] Date of Patent: Nov. 22, 1994

[54] LINEAR FRICTION WELDING OF BLADES

[75] Inventors: Peter J. Gillbanks; Keith C. Moloney, both of Bristol, England

[73] Assignee: Rolls-Royce plc, London, England

[21] Appl. No.: 132,893

[22] Filed: Oct. 7, 1993

[30] Foreign Application Priority Data

Oct. 23, 1992 [GB] United Kingdom ............... 9222256

[51] Int. Cl.⁵ ........................... F01D 5/30; B23K 20/12
[52] U.S. Cl. ........................... 416/213 R; 416/219 R; 228/112.1; 29/889.21; 29/889.721
[58] Field of Search ........... 416/213 R, 219 R, 220 R; 228/2.1, 112.1; 29/889.21, 889.23, 889.721

[56] References Cited

U.S. PATENT DOCUMENTS

| | | | |
|---|---|---|---|
| 3,297,301 | 1/1967 | Petrie et al. | 416/220 R |
| 3,590,454 | 7/1971 | Brass | 29/889.21 |
| 3,609,841 | 10/1971 | Telfer et al. | 29/889.21 |
| 4,883,216 | 11/1989 | Patsfall | 29/889.1 |
| 4,884,736 | 12/1989 | Goddard . | |
| 5,031,288 | 7/1991 | Sadler | 29/889.21 |
| 5,035,411 | 7/1991 | Daines et al. | 228/2.1 |
| 5,148,957 | 9/1992 | Searle | 228/2.1 |
| 5,222,296 | 6/1993 | Doorbar et al. | 29/889.21 |

FOREIGN PATENT DOCUMENTS

| | | | |
|---|---|---|---|
| 0124325 | 10/1984 | European Pat. Off. . | |
| 513669 | 11/1992 | European Pat. Off. | 228/112.1 |
| 1300351 | 7/1969 | Germany | 416/219 R |
| 697687 | 9/1953 | United Kingdom . | |
| 1209478 | 10/1970 | United Kingdom . | |

*Primary Examiner*—Edward K. Look
*Assistant Examiner*—James A. Larson
*Attorney, Agent, or Firm*—Oliff & Berridge

[57] ABSTRACT

A turbine compressor or turbine bladed disc assembly wherein the blades 6 include root portions 8 provided with opposed converging surfaces 9,10 and the disc 14 includes slots 11 provided with opposed diverging surfaces 12,13. In assembly the root portion 8 of a blade 6 is engaged in a slot 11 with abutting converging and diverging surfaces and the blade 6 is oscillated relative to the disc whilst pressure is applied radially to urge the root into close contact with the slot until melting temperature is reached whereupon the oscillatory motion is arrested and the pressure maintained as the converging and diverging surfaces coalesce. A hole 16 may be drilled through the assembled blade and disc assembly in order that communication may be made with cooling air passages in the blade.

5 Claims, 1 Drawing Sheet

LINEAR FRICTION WELDING OF BLADES

BACKGROUND OF THE INVENTION

1. Field of the Invention

This invention relates to gas turbine engines, and in particular, to the bladed compressor and turbine disc assemblies of such engines.

2. Description of Related Arts

In a typical gas turbine engine of the axial flow type there is a number of rotatable bladed compressor and rotor disc assemblies, each assembly comprising an annular array of aerofoil section blades secured to the periphery of a disc. The blades may be secured to the discs in a variety of ways such as, for example, by fashioning the root ends of the blades into "fir tree" form and then pressing them into slots broached into the periphery of the disc. In the known ways of securing the blades to discs the root ends of the blades are formed to a particular configuration and the method of securing the blades to a disc is thus essentially a mechanical one.

SUMMARY OF THE INVENTION

An object of the present invention is to provide a bladed compressor or turbine disc assembly in which the blades are secured to the disc by a form of welding thereby avoiding the need for specially configured and expensive to manufacture blade root forms and the requirement for broaching slots in the disc periphery.

According to one aspect of the invention a method of securing a blade to a disc, the blade having a root and a tip, and the disc having an axis of rotation, comprises the steps of forming the root to include opposed converging surfaces, providing a slot with radially diverging surfaces in the periphery of the disc, said diverging surfaces extending across the periphery of the disc parallel with said axis of rotation, locating said root in said slot with said converging surfaces in engagement with said diverging surfaces, oscillating the blade relative to the disc whilst pressing the root of said blade into said slot until said converging surfaces on said root and said diverging surfaces in said slot reach a temperature at which the material of the converging and diverging surfaces becomes plastic, and arresting said oscillatory motion whilst maintaining the pressure as said converging and diverging surfaces coalesce.

The blade may be a turbine blade or a compressor blade, and a plurality of such blades may be secured to a disc, equally spaced around the periphery of the disc.

Preferably, there are cooling passages extending through the blade and communication may be made with these passages by means of the provision of a hole through the disc.

According to a second aspect of the invention there is provided a turbine or compressor blade and disc assembly wherein a plurality of blades are secured at equal spacings around the disc by means of the method described above.

By oscillating the blade relative to the disc and simultaneously pressing the blade and disc together it will be realised that the method of the invention has certain similarities to the known techniques of friction welding and inertia welding.

In friction welding coalescence is produced by the heat of friction generated by rotating one piece against another under controlled axial pressure. The two surfaces in contact are heated to a temperature, at which the adjacent material becomes plastic. The relative motion between the two is then stopped, the blade returned to its original position, and a forging pressure applied which upsets the Joint slightly. This pressure may be equal or in excess of the pressure prevailing during the heating, its value depending on the type of material being welded.

Inertia welding is slightly different. The rotating spindle with a replaceable flywheel attached is also brought up to a preset initial speed. The welding cycle starts when the non-rotating part is pushed against the rotating part, but the driving power is cut off simultaneously and results in a rapid drop of rotating speed and rotation stops completely in a very short time. In essence inertia welding tends to blend the heating and forging phases rather quickly with all the stored energy being practically dumped at the interface all of a sudden. On the other hand the friction welding process usually has a distinct heating period before forging takes place.

In the method of the present invention the welding step requires relative oscillatory motion of the two parts to be joined together and not relative rotary motion as occurs in friction and inertia welding.

BRIEF DESCRIPTION OF THE DRAWINGS

The invention will now be described further by way of example with reference to the accompanying drawings in which.

DETAILED DESCRIPTION OF PREFERRED EMBODIMENTS

Figure 1:
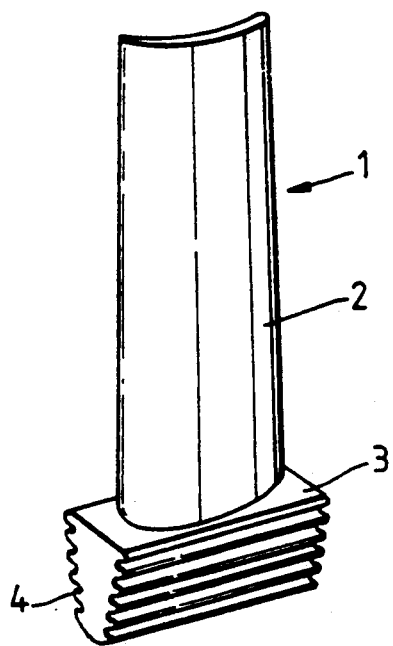
FIG. 1 shows a typical known turbine blade with a "fir tree" root.

Referring to FIG. 1 of the drawings the known turbine blade 1 comprises an aerofoil section member 2 integrally formed with a fir tree root 3. The root has a series of axially extending serrations 4 which involve very accurate machining to ensure that the loading applied to the blade is shared by all of the serrations. The slot in the periphery of the disc to receive the fir tree root 3 requires similar accurate machining.

Figure 2:
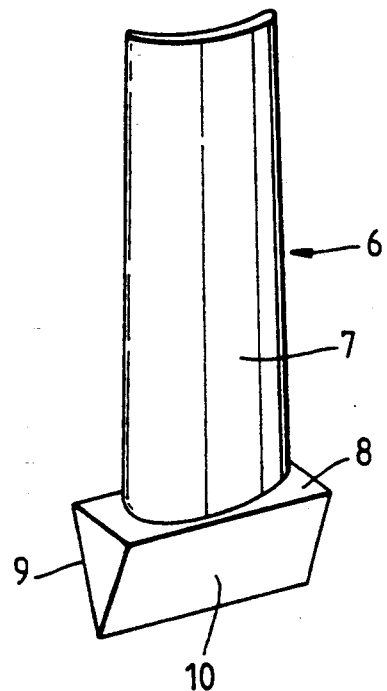
FIG. 2 shows a turbine blade with a "wedge" root used in the present invention.

FIG. 2 shows a turbine blade 6 of the present invention made from e.g. a nickel based alloy. The blade comprises an aerofoil section member 7 which is identical in all respects to the member 2 of FIG. 1. Integrally formed with the member 7 is a root 8 which is of generally wedge-like form having converging surfaces 9,10 extending axially of the blade 6.

Figure 3:
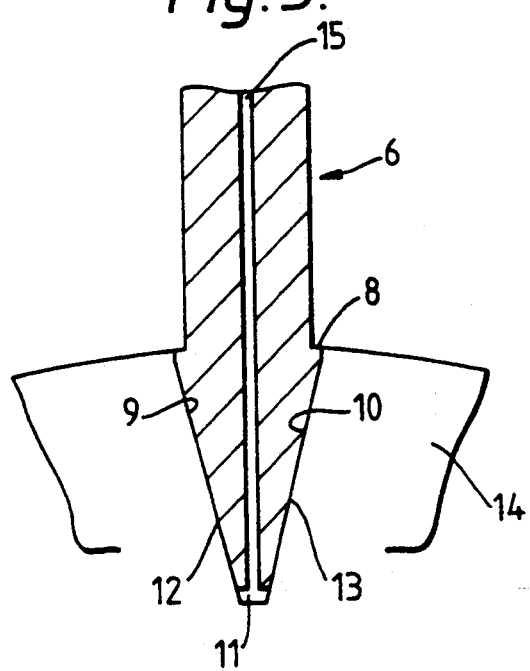
FIG. 3 shows the "wedge" root of the turbine blade of FIG. 2 located in a slot in a turbine disc.

As shown in FIG. 3 the root 8 of the blade 6 is located in a slot 11 formed by inclined surfaces 12,13 in a disc 14 also made from a nickel based alloy. The surface 9 of the root 8 engages the inclined surface 12 of the slot 11 whilst the surface 10 of the root engages the inclined surface 13 of the slot 11. With the disc 14 fixed against movement, the blade 6 is oscillated rapidly and is simultaneously pressed radially inwards towards the disc until the surfaces 9 and 10 of the root 8, and the surfaces 12 and 13 of the slot 11 become plastic. Once this has been reached the oscillatory motion of the blade 6 is stopped and the radial pressure upon the blade maintained until the engaging surfaces of the root and slot coalesce with the result that the blade and disc become an integrated assembly.

It will be realised that in practice the roots of some or all of the blades in any array may be secured to a disc simultaneously.

Figure 4:
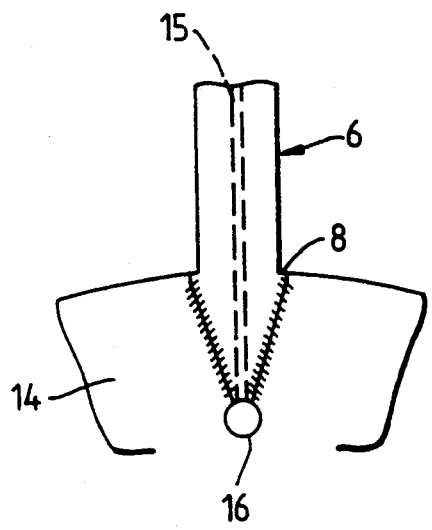
FIG. 4 shows part of a turbine blade and disc assembly ready for use.

As is well known, turbine blades may be provided with a number of passageways 15 extending generally from root to tip in order that cooling air may be passed through the blades during engine operation. To avoid these passageways becoming blocked by the method employed to secure the blades to the disc it is advantageous to drill a hole 16 through the Junction of the two members as shown in FIG. 4 where the hole has been centred upon the apex of the root wedge. De-burring of the edges of the hole and passageways may be carried out by chemical or other means if required.

We claim:

1. A method of friction welding a blade having internal cooling passages to a disc during which the blade and the disc are reciprocated relatively while being urged together with sufficient force to generate frictional heating, the method comprising the steps of:

forming the blade having an aerofoil section with the internal cooling passages and a root section containing an internal passageway communicating with the internal cooling passages of the aerofoil section;

forming the root section with a taper having converging opposed surfaces;

forming in the periphery of the disc a slot with radially diverging surfaces for receiving the tapered root section of the blade;

inserting said root in said slot with said converging surfaces of the root section engaged with said diverging surfaces of the disc slot;

relatively reciprocating the blade and the disc while pressing the root of said blade into said slot thereby generating frictional welding heat and applying a generally radial weld generating force; and subsequently forming an axial passage through a weld region thereby intersecting the internal passageway of the blade root section thereby providing open communication with the internal cooling passages of the aerofoil section of the blade.

2. A method as claimed in claim 1, wherein the step of forming the axial passageway includes drilling.

3. A method as claimed in claim 1, further comprising extending the internal passageway of the root section to an apex of the root section.

4. A method as claimed in claim 1, further comprising providing a plurality of slots and blades equally spaced around the periphery of the disc.

5. A blade and disc assembly made by the method as claimed in claim 1.

* * * * *